United States Patent [19]

Nakamura

[11] 4,394,569
[45] Jul. 19, 1983

[54] FOCUS DETECTING METHOD AND APPARATUS

[75] Inventor: Kazuo Nakamura, Shiki, Japan

[73] Assignee: Asahi Kogaku Kogyo Kabushiki Kaisha, Tokyo, Japan

[21] Appl. No.: 218,132

[22] Filed: Dec. 19, 1980

[30] Foreign Application Priority Data

Dec. 29, 1979 [JP] Japan .................. 54-172963

[51] Int. Cl.$^3$ .............................................. G01J 1/36
[52] U.S. Cl. ...................................... 250/204; 354/25
[58] Field of Search ............... 250/201, 204, 209, 578; 354/25; 356/1, 4

[56] References Cited

U.S. PATENT DOCUMENTS

| | | | |
|---|---|---|---|
| 4,173,402 | 11/1979 | Horike et al. ......................... | 354/25 |
| 4,254,330 | 3/1981 | Stauffer et al. ...................... | 250/204 |
| 4,265,520 | 5/1981 | Tokutomi et al. ..................... | 354/25 |
| 4,314,151 | 2/1982 | Suzuki et al. ........................ | 250/204 |

Primary Examiner—David C. Nelms
Attorney, Agent, or Firm—Sughrue, Mion, Zinn, Macpeak and Seas

[57] ABSTRACT

An automatic focusing device and method for a camera in which the distance and direction to the focused position of a focusing lens of the camera are quickly determined after which the lens is moved directly to the focused position without the necessity of carrying out calculations as the lens is moved. Images of an object being viewed through the lens are projected onto first and second sensor groups. The outputs of the sensor groups are digitized then calculations are performed to determine the distance and direction to the position of correct focus. The lens is then moved to the focused position directly in accordance with the computed values.

6 Claims, 12 Drawing Figures

FOCUS DETECTING METHOD AND APPARATUS

BACKGROUND OF THE INVENTION

The present invention relates to a focus detection and processing method and apparatus employing a double-image coincidence technique by which an object's image is divided into two parts, the two parts are displaced in opposite directions or one of the two parts is displaced. When the object is in focus, the relative displacement of the two parts becomes a minimum. The outputs of a pair of photoelectric conversion element groups (hereinafter referred to as "sensor groups", when applicable) are processed to electrically detect the focusing position. More particularly, the invention relates to a focus detection and processing method and apparatus for a camera in which the sign of a focus detection output is changed before and after focusing. Not only front and rear foci are detected, but also an amount of movement of the photographing lens to the focusing position is instantly detected wherever the photographing lens is positioned.

A number of focus detecting techniques utilizing variations of spatial frequency, variations in contrast of an object's image or the above-described double-image coincidence technique have been proposed in the art and some of them have been put into practical use.

However, most of the conventional focus detecting techniques are disadvantageous in the following points. In these systems, when an object is in focus, the focus detection output has an extreme value, either a maximum value or a minimum value, and hence front and rear focus information is not available. Accordingly, in order to detect a focusing position, the focus detecting operation must be carried out over an entire photographing range of from infinity to the closest focusing distance. Thus, the operation of the device is intricate and the required detection time is long with the result that focus detection is impossible for a quickly moving object.

A focus detecting technique capable of providing front and rear focus information has been also proposed in the art. However, even with this technique, it is difficult to sufficiently carry out focus detection for a quickly moving object. Accordingly, the use of the camera is greatly limited and it is difficult to make the optimum use of all the functions of the camera.

SUMMARY OF THE INVENTION

Accordingly, an object of the invention is to provide a focus detecting method and apparatus for a camera in which the principle of double-image coincidence is utilized so that the focus of a quickly moving object, such as a moving automobile or a ball or players in sports which cannot be detected with a conventional focus detecting technique, can be satisfactorily detected, that is, the foci of a variety of objects over a wide speed range can be satisfactorily detected.

Specifically, in accordance with this and other objects of the invention, there is provided an automatic focusing device for a camera including means for determining a distance and direction to a focused position of a focusing lens while the focusing lens remains stationary and means for moving the focusing lens directly to the focused position in response to an output of the distance and direction determining means. The distance and direction determining means preferably includes first and second sensor groups, means for projecting images of an object transmitted through the focusing lens onto the first and second sensor groups, and means for shifting at least one of the images on the two sensor groups.

In preferred embodiments, the focused position of a lens is quickly calculated in accordance with formulas disclosed herein, such as with a micro-processor, so that the lens can be quickly moved to the correct focused position without having to perform successive calculations as the lens is moved as was needed with prior art focusing devices. Furthermore, the invention encompasses a method by which this focusing device operates.

DESCRIPTION OF THE PREFERRED EMBODIMENTS

A preferred embodiment of the invention will be described with reference to FIGS. 1 through 6.

Figure 1:
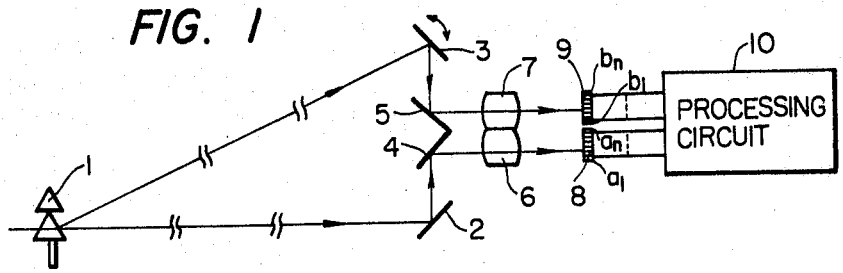
FIG. 1 is a schematic diagram showing a focus detecting device utilizing the conventional principle of double-image coincidence.

FIG. 1 schematically shows an optical system, sensor groups and a processing circuit in a focus detecting device employing the principle of a double-image coinciding method. In FIG. 1, light from an object 1 is reflected by stationary mirrors 2 and 4 and is then applied through an image forming lens 6 to sensors $a_1$ through $a_n$ in a sensor group 8. The sensors produce outputs proportional the quantities of light incident thereon with the outputs being coupled to a processing circuit 10. Further, light from the object 1 is also reflected by a movable mirror 3 which is rotatable in the direction of the arrow and by a stationary mirror 5 and is then applied through another image forming lens 7 to sensors $b_1$ through $b_n$ in a second sensor group 9. Similarly, these sensors produce outputs proportional to the quantity of incident light with their outputs being coupled to the processing circuit 10.

The principle of focus detecting employed by the invention will be described with reference to FIGS. 1 and 2.

The object's image on the sensor group 9 is moved along the sensor line as the movable mirror 3 is turned. That is, as the movable mirror 3 is turned counterclockwise, the object's image is moved upwardly.

Figure 2:
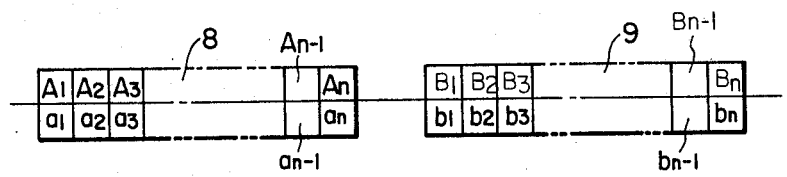
FIG. 2 is an explanatory diagram showing the arrangement of light receiving surfaces of two sensor groups and the relationships thereof.

The sensors $a_1$ through $a_n$ have light receiving surfaces $A_1$ through $A_n$, respectively, as shown in FIG. 2. Similarly, the sensors $b_1$ through $b_n$ have light receiving surfaces $B_1$ through $B_n$, respectively. The sensors and mirrors are positioned such that when the object is in focus, optically the same images are projected onto the light receiving surfaces $A_1$ and $B_1$, $A_2$ and $B_2$, ... and $A_n$ and $B_n$ and the sensors $a_1$ through $a_n$ provide outputs $i_1$ through $i_n$, respectively while the sensors $b_1$ through $b_n$ provide outputs $j_1$ through $j_n$, respectively. Thus, $i_1=j_i$, $i_2=j_2$, ... and $i_n=j_n$, where n is the number of sensors in each group. When the object is out of focus, in general $i_1 \neq j_1$, $i_2 \neq j_2$, ... and $i_n \neq j_n$. Therefore, if a calculation $$V = \sum_{k=1}^{n} |i_k - j_k|$$

is carried out by the processing circuit 10 and the calculation result is employed as a focus detection signal, then V=0 (minimum value) when the object is in focus, and V>0 when the object is out of focus. Thus, the focusing position can be detected.

Described above is a technique which utilizes the principle of the conventional double-image coinciding method. With this technique, when the object is out of focus, signals representative of front focus or rear focus, for instance, cannot be obtained.

In accordance with the invention, as described below, the optical system, sensor groups and sensors' outputs $i_1$ through $i_n$ and $j_1$ through $j_n$ in the double-image coinciding method as described with reference to FIGS. 1 and 2 are utilized in such a manner that the processing circuit 10 can quickly detect a direction to the focusing position and a distance to the focusing position.

Figure 3A:
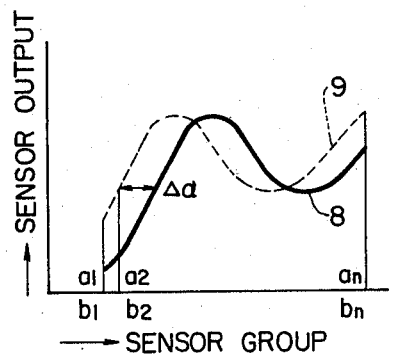
FIG. 3A is a graphical representation indicating an object's image on a second sensor group which is shifted to the left with respect to that on a second sensor group.
Figure 3B:
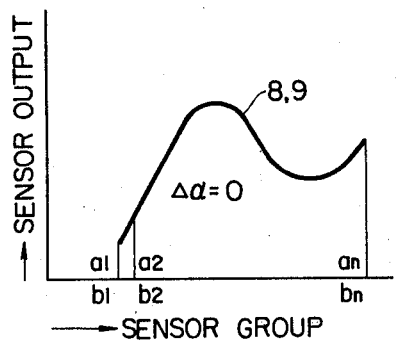
FIG. 3B is a graphical representation indicating an object's image on the second sensor group which coincides with that on the first sensor group.
Figure 3C:
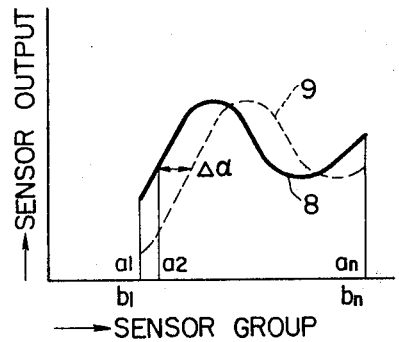
FIG. 3C is also a graphical representation indicating an object's image on the second sensor group which is shifted to the right with respect to that on the first sensor group.

FIGS. 3A–3C show the outputs of the sensors in the sensor groups 8 and 9 when the movable mirror 3 in FIG. 1 is turned. In FIGS. 3A–3C, the solid lines and the broken lines correspond to the object's images projected onto the two sensor groups. The graphical representation in FIG. 3B is obtained when the object is in focus. That is, in this case the two object's images are coincident with each other. As the movable mirror 3 in FIG. 1 is turned, the object's image on the sensor group 9 is moved from left to right with respect to the sensor group 9, in the order of FIGS. 3A to 3C. The amount of movement $\Delta\alpha$ of the object's image is proportional to the amount of rotation of the movable mirror 3. By detecting the amount of movement $\Delta\alpha$, the direction and the distance to the focusing position can be detected. The value $\Delta\alpha$ has a positive sign when the broken line is on the left-hand side of the solid line and has a negative sign when the broken line is on the right-hand side of the solid line. In accordance with the invention, the value $\Delta\alpha$ is detected and utilized to provide front and rear focus information.

Figure 4A:
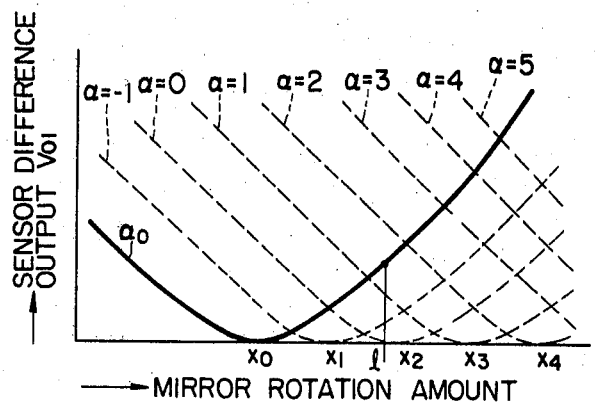
FIG. 4A is a graphical representation indicating variations of a sensor difference output $V_{01}$ in the case where the object's image on the second sensor group is moved to the right from the first left sensor.

FIG. 4A shows variations of a sensor difference output $V_{01}$ (described below) with the amount of rotation of the mirror from the focusing point. The curve $\alpha_0$ is obtained when the object's image on the sensor group 9 is moved to the left through a distance of one sensor position as shown in FIG. 3A. The sensor difference output $$V_{01} = \sum_{k=1}^{n-1} |i_k - i_{k+1}| \times \beta_0$$

becomes a minimum at the point $x_0$, that is, when the same object's images are projected on the sensors $a_2$ and $b_1$, $a_3$ and $b_2$ ... and $a_n$ and $b_{n-1}$, respectively.

The curve $\alpha=-1$ is obtained when the projected image on the sensor group 9 coincides with that on the sensor group 8, corresponding to FIG. 3B. The sensor difference output $$V_{01} = \sum_{k=1}^{n} |i_k - j_k| \times \beta_1$$

becomes a minimum at the point $x_1$, that is, when the same object's images are projected on the sensors $a_1$ and $b_1$, $a_2$ and $b_2$, ... and $a_n$ and $b_n$, respectively.

The curve $\alpha=0$ is obtained when the object's image on the sensor group 9 is moved to the right through a distance of one sensor position as shown in FIG. 3C. The sensor difference output $$V_{01} = \sum_{k=1}^{n-1} |i_k - j_{k+1}| \times \beta_2$$

becomes minimum at the point $x_2$, that is, when the same object's images are projected on the sensors $a_1$ and $b_2$, $a_2$ and $b_3$, ... and $a_{n-1}$ and $b_n$, respectively.

Similarly, the curves $\alpha=1$, $\alpha=2$, $\alpha=3$, and so forth are obtained when the projected image on the sensor group 9 is moved to the right by two sensor positions, three sensor positions, four sensor positions, and so forth, respectively, for which case the sensor difference outputs $V_{01}$ are:

$$V_{01} = \sum_{k=1}^{n-2} |i_k - j_{k+2}| \times \beta_3,$$

$$V_{01} = \sum_{k=1}^{n-3} |i_k - j_{k+3}| \times \beta_4,$$

$$V_{01} = \sum_{k=1}^{n-4} |i_k - j_{k+4}| \times \beta_5,$$

and so forth. In the abovedescribed sensor difference outputs $V_{01}$, $\beta_0$, $\beta_1$, $\beta_2$, ... are correction values corresponding to the numbers of sensor outputs added. $\beta_0 = n/(n-1)$, $\beta_1 = n/n$, $\beta_2 = n/(n-1)$, $\beta_3 = n/(n-2)$, $\beta_4 = n/(n-3)$, and so forth. Alternately, $\beta_0 = 1/(n-1)$, $\beta_1 = 1/n$, $\beta_2 = 1/(n-1)$, $\beta_3 = 1/(n-2)$, $\beta_4 = 1/(n-3)$ and so forth.

Most generally, the sensor difference output $V_{01}$ for the curves $\alpha=0$, $\alpha=1$ and so on can be expressed as follows:

$$V_{01} = \sum_{k=1}^{n-\alpha} |i_k - j_{k+\alpha}| \times n/(n-\alpha).$$

The results which are obtained by subtracting the sensor difference outputs $V_{01}$ for the curves $\alpha=-1$, $\alpha=0$ and so forth from the sensor difference output $V_{01}$ for the curve $\alpha_0$ will be referred to as zero (0) position detection outputs $F_{01}$. When the amount of rotation of the mirror is 1, the zero position detection outputs $F_{01}$ are positive with respect to the curves $\alpha=1$, $\alpha=0$ and $\alpha=-1$ and are negative with respect to the curves $\alpha=2$, $\alpha=3$, $\alpha=4$, $\alpha=5$ and so on as is apparent from FIG. 4B.

The zero position detection output $F_{01}$ for the curves $\alpha_0$ and $a=0$ is as follows:

$$F_{01} = \sum_{k=1}^{n-1} |i_{k+1} - j_k| \times \beta_0 - \sum_{k=1}^{n-1} |i_k - j_{k+1}| \times \beta_2$$

where $\beta_0 = \beta_2 = n/(n-1)$. This expression can be decomposed as follows:

$$\{(|i_2-j_1|-|i_1-j_2|)+(|i_3-j_2|-|i_2-j_3|)+ \cdots \\ +(|i_n-j_{n-1}|-|i_{n-1}-j_n|)\} \times n/(n-1)$$

As can be seen from this expression, the output $F_{01}$ becomes zero when the same object's image is projected onto the sensor groups 8 and 9. However, the output $F_{01}$ becomes negative and positive respectively before and after this position.

Similarly, the zero position detection output $F_{01}$ for the curve $\alpha=-1$ becomes zero when the object's image on the sensor group 9 is moved to the left through a distance of one sensor position as shown in FIG. 3C and the output $F_{01}$ becomes negative and positive respectively before and after this position.

Furthermore, the zero position detection outputs $F_{01}$ for the curves $\alpha=1$, $\alpha=2$, $\alpha=3$ and so forth become zero when the object's image on the sensor group 9 is moved to the right by one sensor position, two sensor positions, three sensor positions and so forth as shown in FIG. 3C, respectively, and the outputs $F_{01}$ become negative and positive respectively before and after this position. The values of $\alpha$ in FIG. 4A indicate the numbers of sensors by which the object's image on the sensor group 9 is moved with the movement of the object's image to the right indicated by the positive sign. Thus, for example, if the mirror rotation amount is 1, it can be detected that the object's image has been moved to the right by two sensor positions from "1".

Figure 4B:
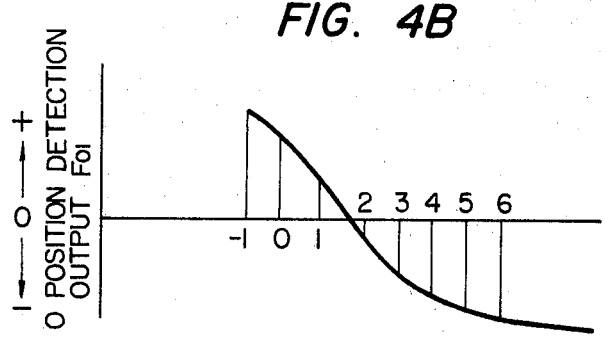
FIG. 4B is a graphical representation indicating variations of a zero position detection output $F_{01}$ corresponding to the variations of the sensor difference output $V_{01}$ in FIG. 4A.

FIG. 4B indicates the zero position detection output $F_{01}$ with the amount of sensor movement. From FIG. 4B, it can be understood that the point where $F_{01}=0$ (the sign is changed) falls between a sensor movement amount 1 ($\alpha=1$ in FIG. 4A) and a sensor movement amount 2 ($\alpha=2$ in FIG. 4A). If the output $F_{01}$ changes linearly between the sensor movement amounts 1 and 2, then the actual sensor movement amount M is:

$$M = 1 + F_1/(F_1 - F_2),$$

where $F_1$ is the value of $F_{01}$ in the case of the curve $\alpha=1$ in FIG. 4A and $F_2$ is the value of $F_{01}$ in the case of the curve $\alpha=2$. Generally, if the output $F_{01}$ changes signs between sensor movement amounts S and S+1 and the respective values $F_{01}$ are represented by $F_S$ and $F_{S+1}$, then $M = S + F_S/(F_S - F_{S+1})$.

The movement of the object's image is proportional to the amount of movement of the photographing lens which is required for focusing the lens on the object. If the proportional constant is represented by K, then the focus detection output is $V_{out} = K \times M$. The constant K may be a theoretically or empirically obtained value. The employment of the focus detection output $V_{out}$ makes it possible to detect the distance and the direction to the focusing position.

Described above is a detection method in the case where the object's image on the sensor group is moved to the right from the first left sensor. Next, a detection method in the case where the object's image is moved to the left from the first right sensor, will be described with reference to FIGS. 4C and 4D.

Figure 4C:
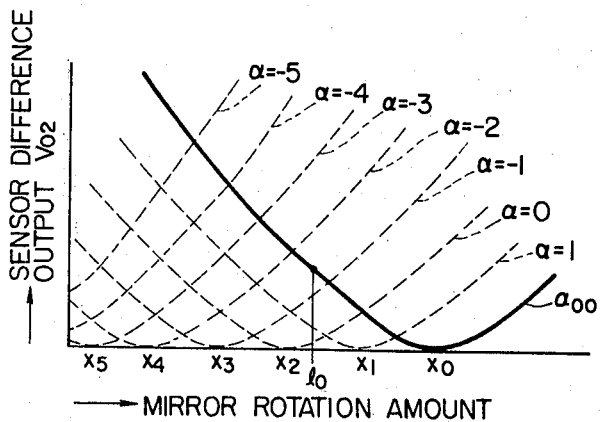
FIG. 4C is a graphical representation indicating variations of a sensor difference output $V_{02}$ in the case where the object's image is moved to the left from the first right sensor.

In FIG. 4C, the curve $\alpha_{00}$ corresponds to the case where the sensor groups 8 and 9 are interchanged with respect to the curve $\alpha_0$. That is, the sensor difference output $V_{01}$ for the curve $\alpha_{00}$ is represented by $$V_{01} = \sum_{k=1}^{n-1} |i_k - j_{k+1}| \times \beta_0.$$

Figure 4D:
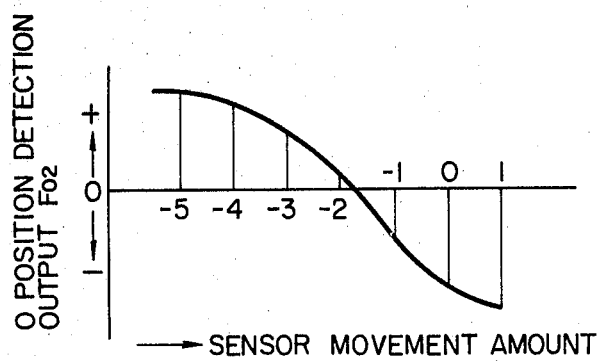
FIG. 4D is a graphical representation indicating variations of a zero position detection output $F_{02}$ corresponding to the variations of the sensor difference output $V_{02}$ in FIG. 4C.

Similarly, the sensor difference outputs $V_{01}$ for the curves $\alpha=1$, $\alpha=0$, $\alpha=-1$ and so forth can be represented respectively as follows:

$$V_{01} = \sum_{k=1}^{n} |i_k - j_k| \times \beta_1,$$

$$V_{01} = \sum_{k=1}^{n-1} |i_{k+1} - j_k| \times \beta_2,$$

$$V_{01} = \sum_{k=1}^{n-2} |i_{k+2} - j_k| \times \beta_3, \text{ and so forth.}$$

Where the mirror movement amount is $l_0$ as shown in FIG. 4C, the sign of zero position detection output $F_{02}$ changes from negative to positive between $\alpha=-1$ and $\alpha=-2$, as shown in FIG. 4D. If the outputs $F_{02}$ for the curves $\alpha=-1$ and $\alpha=-2$ are represented by $F_1$ and $F_2$, respectively, then the actual sensor movement amount is $M = -1 - F_1/(F_1 - F_2)$. As in the above-described case, generally $M = S - F_S(F_S - F_{S+1})$. The focus detection output $V_{out}$ is ($K \times M$).

As is clear from the above description, if the focus detection operation is carried out by observing the object with the movable mirror 3 in FIG. 1 at a given position, the employment of the focus detection output $V_{out}$ makes it possible to detect the distance to the focusing position from its absolute value and the direction to the focusing position can be detected from its sign.

Figure 4E:
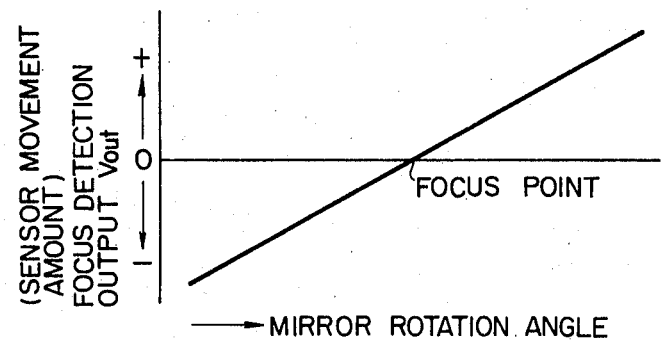
FIG. 4E is a graphical representation indicating variations of a focus detection output $V_{out}$ obtained according to the invention.

FIG. 4E indicates the focus detection output $V_{out}$ with respect to the mirror rotation angle.

In the optical system of FIG. 1, the amount of movement of the object's image is proportional to the mirror rotation angle and therefore the plot of the focus detection output $V_{out}$ is linear.

For other optical systems also, the invention can be considerably effectively utilized employing the principle of double-image coincidence with the amount of adjustment of the focus adjusting member being proportional to the amount of movement of the object's image.

A focus detecting method according to the invention has been described above. It goes without saying that, in constructing an automatic focus detecting device according to the invention, the amount of rotation of the photographing lens drive motor can be controlled according to the absolute value of the focus detection output $V_{out}$ formed as described above and the direction of rotation of the motor can be controlled according to the sign of the output $V_{out}$.

Figure 5:
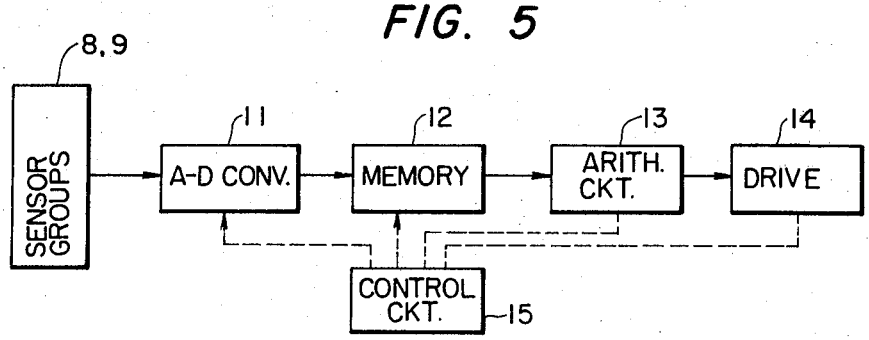
FIG. 5 is a block diagram showing a processing circuit for practicing a focus detecting method according to the invention.

A device for practicing the focus detecting method according to the invention is shown in FIG. 5. The outputs $i_l$ through $i_n$ and $j_l$ through $j_n$ of sensor groups 8 and 9 are applied to an analog-to-digital converter 11 where they are converted to digital data which is stored in order in a memory circuit 12. The converter 11 and memory circuit 12 are controlled by a control circuit 15. The above-described sensor difference outputs $V_{01}$ and $V_{02}$, zero position detection outputs $F_{01}$ and $F_{02}$, sensor movement amount M and focus detection output $V_{out}$ are calculated in an arithmetic circuit 13 under the control of the control circuit 15. The focus detection output $V_{out}$ of the arithmetic circuit 13 is applied to a drive circuit 14, including a lens drive circuit and a display circuit, to carry out the focusing operation. The above-described arrangement can be simplified by the utilization of a microprocessor. For example, the memory, arithmetic circuit and the control circuit can be implemented with an Intel Corporation type 8080 microprocessor integrated circuit.

Figure 6A:
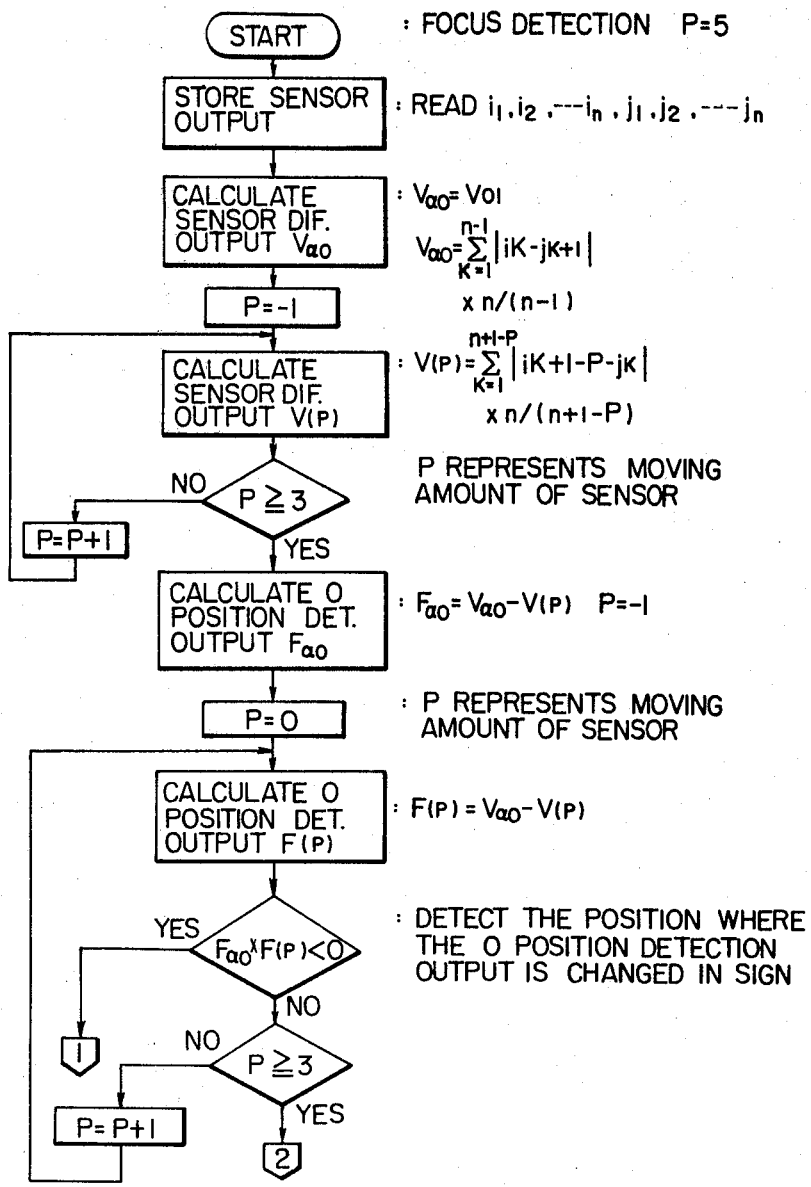
FIG. 6 is a flow chart showing operations for practicing the focus detecting method according to the invention.
Figure 6B:
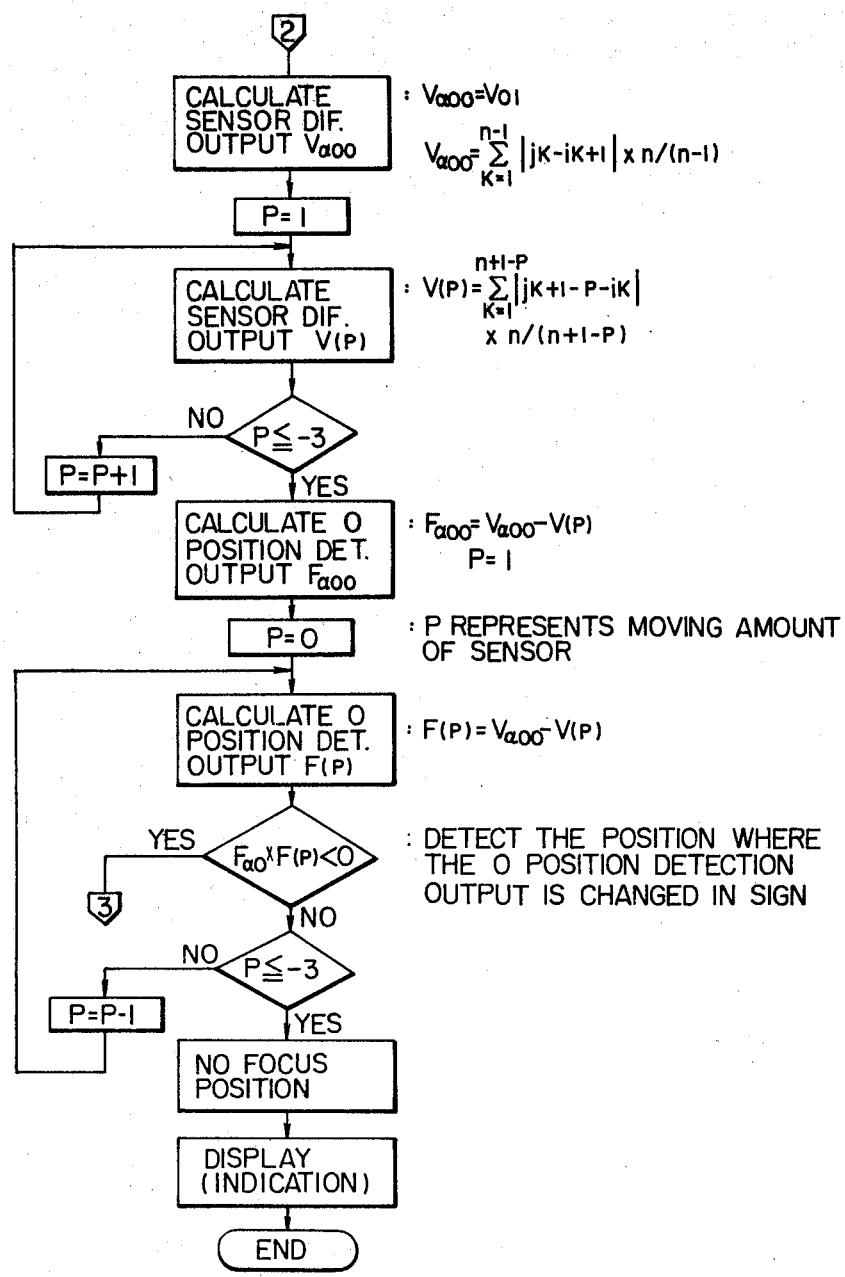
Figure 6C:
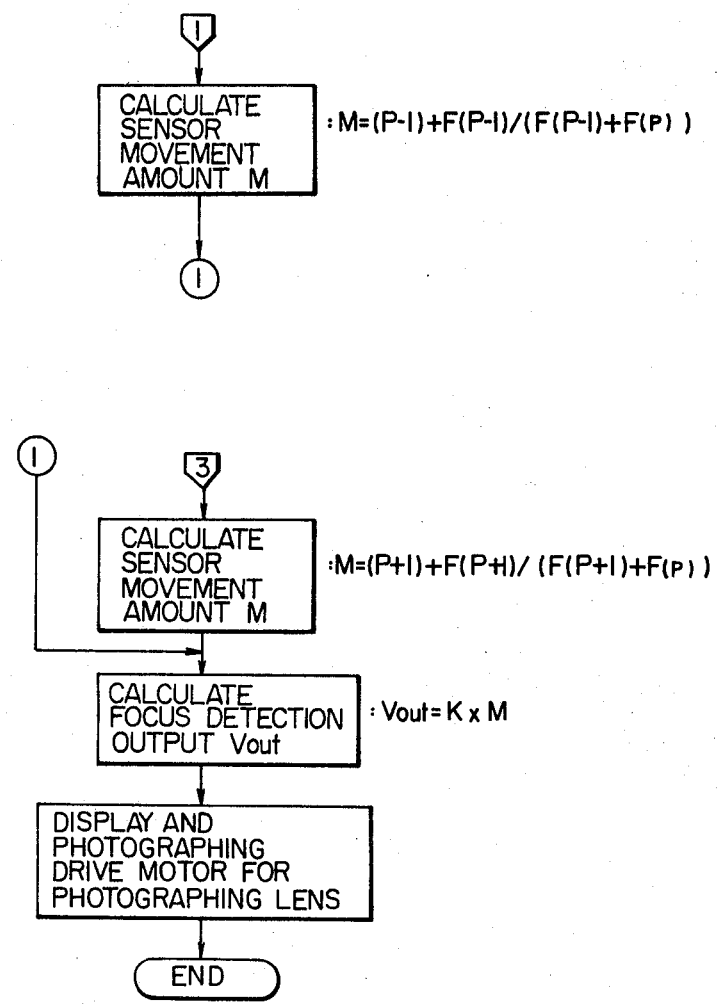

FIG. 6 is a flow chart showing operations according to the invention. By way of example, the case of p=5 will be described. (Although any value p<n is acceptable, it is desirable that p be small because the result of addition of the sensor difference outputs $V_{01}$ and $V_{02}$ becomes small as the value p approaches the value n.)

With a focus detection start signal obtained, for instance, by actuation of a focus detection start switch, as a trigger signal, the sensor outputs $i_l$ through $i_n$ and $j_l$ through $j_n$ are read into the memory circuit as digital numbers. Then, after the reference sensor difference output $V_{\alpha 0}$ in the case when the object's image on the sensor group 9 is moved to the right from the first left (−1) sensor) is calculated, the sensor difference outputs V(−1), V(0) ... and V(3) are computed. Then, the output $V_{\alpha 0}$ is multiplied by the outputs V(p) successively thereby to obtain a sensor movement amount p which is at first different in sign from $V_{\alpha 0}$. The actual sensor movement amount M is calculated from the value p from which a focus detection output $V_{out}$ is obtained. According to the focus detection output $V_{out}$, the display device and the photographing lens are operated to set the lens to the focusing position.

When no sign change is included in the product $V_{\alpha 0} \times V(p)$, the reference sensor difference output $V_{\alpha 00}$ in the case where the object's image is moved to the left from the first right sensor is calculated. Similar to the above-described case, calculations are carried out to obtain a sensor movement amount p. The focusing position is obtained from the value p.

If the sensor movement amount p cannot be obtained, it is displayed that focus cannot be detected.

As is apparent from the above description, in the focus detecting method and apparatus according to the invention, an optical system utilizing the principle of double-image coincidence, which is simple to implement, is used, and immediately upon the focus detection being carried out according to the particular calculation method of the invention with the camera directed towards the object, a direction and a distance to the focusing position can be obtained. Accordingly, the camera can be focused on a quickly moving object which a device using the conventional detecting method cannot follow. That is, a camera using the invention can be focused on a variety of objects, either stationary or moving.

What is claimed is:

1. An automatic focusing device for a camera comprising:
   first and second sensor groups;
   means for projecting images of an object transmitted through a focusing lens onto said first and second sensor groups;
   means for shifting at least one of said images on said sensor groups;
   means for converting outputs of said first and second sensor groups to digital numbers;
   means for storing said digital numbers;
   calculating means for determining in succession:
   (1) a first set of successive values of:

$$F = \sum_{k=1}^{n-1} |i_{k+1} - j_k| \times \beta_0 - \sum_{k=1}^{n-1-p} |i_{k-1-p} - j_k| \times \beta_{p+2}$$

for successive values of p for positive values of F, and a second set of successive values of:

$$F = \sum_{k=1}^{n-1} |i_k - j_{k+1}| \times \beta_0 - \sum_{k=1}^{n-1-p} |j_{k-1-p} - i_k| \times \beta_{p+2}$$

for successive values of p for negative values of F where $i_k$ are ones of said digital numbers corresponding to sensors of said first sensor group, $j_k$ are ones of said digital numbers corresponding to sensors of said second sensor group with k indicating sensor positions within said sensor groups, n is the number of sensors in each said sensor group, p = −1, 0, 1, 2, ... P with P being an integer less than n, $\beta_0 = A_0/(n-1)$, $\beta_{p+2} = A_0/(n-p-1)$ and $A_0$ is a predetermined constant;
   (2) values of $F = F_S$ and $F = F_{S+1}$ where $F_S$ represents the value of F before a change in the sign of F and $F_{S+1}$ represents the value of F after a change in the sign of F for successive values of p, and S corresponds to an image movement amount from a prior position to a position corresponding to the value of p before said change in sign of F; and
   (3) a value of $M = S + F_S/(F_S - F_{S+1})$ if said change in the sign of said value F occurs during said first set of values and $M = S - F_S/(F_S - F_{S+1})$ if said change in the sign of said value F occurs during said second set of values;
   and means for moving said lens directly from said prior position to a focused position determined in accordance with said value of M.

2. The automatic focus detecting device of claim 1 wherein said moving means moves said lens linearly in response to said value of M.

3. The automatic focus detecting device of claim 1 wherein P is significantly less than n.

4. A method for automatically focusing a camera having a focusing lens, first and second sensor groups, and means for projecting images of an object transmitted through said focusing lens onto said first and second sensor groups, said method comprising;

shifting at least one of said images on said sensor groups;
converting outputs of said first and second sensor groups to digital numbers;
storing said digital numbers;
determining first set of successive values of:

$$F = \sum_{k=1}^{n-1} |i_{k+1} - j_k| \times \beta_0 - \sum_{k=1}^{n-1-p} |i_{k-1-p} - j_k| \times \beta_{p+2}$$

for successive values of p for positive values of F, and a second set of successive values of:

$$F = \sum_{k=1}^{n-1} |i_k - j_{k+1}| \times \beta_0 - \sum_{k=1}^{n-1-p} |j_{k-1-p} - i_k| \times \beta_{p+2}$$

for successive values of p for negative values of F where $i_k$ are ones of said digital numbers corresponding to sensors of said first sensor group, $j_k$ are ones of said digital numbers corresponding to sensors of said second sensor group with k indicating sensor positions within said sensor groups, n is the number of sensors in each said sensor group, $p = -1, 0, 1, 2, \ldots P$ with P being an integer less than n, $\beta_0 = A_0/(n-1)$, $\beta_{p+2} = A_0/(n-p-1)$ and $A_0$ is a predetermined constant;

determining values of $F = F_S$ and $F = F_{S+1}$ where $F_S$ represents the value of F before a change in the sign of F and $F_{S+1}$ represents the value of F after a change in the sign of F for successive values of p, and S corresponds to an image movement amount from a prior position to a position corresponding to the value of p before said change in sign of F;

determining a value of $M = S + F_S/(F_S - F_{S+1})$ if said change in the sign of said value F occurs during said first set of values and $M = S - F_S/(F_S - F_{S+1})$ if said change in the sign of said value F occurs during said second set of values; and moving said lens directly from said prior position to a focused position determined in accordance with said value of M.

5. The focusing method of claim 4 wherein said positioning is accomplished linearly with respect to M.

6. The focusing method of claim 4 wherein P is significantly less than n.

* * * * *